United States Patent
Botts et al.

(10) Patent No.: US 11,903,393 B2
(45) Date of Patent: Feb. 20, 2024

(54) METHOD FOR THE PREPARATION OF A MONOGLYCERIDE HYDRATE PRODUCT

(71) Applicant: CARAVAN INGREDIENTS INC., Lenexa, KS (US)

(72) Inventors: Jeff Bradley Botts, Lenexa, KS (US); Jimmy Ray Doucet, Lenexa, KS (US)

(73) Assignee: CARAVAN INGREDIENTS INC., Lenexa, KS (US)

(*) Notice: Subject to any disclaimer, the term of this patent is extended or adjusted under 35 U.S.C. 154(b) by 0 days.

(21) Appl. No.: 18/085,360

(22) Filed: Dec. 20, 2022

(65) Prior Publication Data

US 2023/0122880 A1 Apr. 20, 2023

Related U.S. Application Data

(63) Continuation of application No. 16/093,525, filed as application No. PCT/US2017/027527 on Apr. 14, 2017, now Pat. No. 11,564,401.

(60) Provisional application No. 62/323,074, filed on Apr. 15, 2016.

(30) Foreign Application Priority Data

Apr. 15, 2016 (EP) .................................... 16165612

(51) Int. Cl.

| | | |
|---|---|---|
| *A23D 9/013* | (2006.01) | |
| *A23L 29/00* | (2016.01) | |
| *A23L 33/12* | (2016.01) | |
| *A21D 2/16* | (2006.01) | |
| *A23L 29/10* | (2016.01) | |
| *A23D 7/01* | (2006.01) | |
| *A23D 7/04* | (2006.01) | |
| *A23L 33/115* | (2016.01) | |
| *A23D 7/005* | (2006.01) | |
| *A23D 7/05* | (2006.01) | |

(52) U.S. Cl.
CPC .............. *A23D 9/013* (2013.01); *A21D 2/16* (2013.01); *A23D 7/0053* (2013.01); *A23D 7/011* (2013.01); *A23D 7/04* (2013.01); *A23D 7/05* (2013.01); *A23L 29/015* (2016.08); *A23L 29/04* (2016.08); *A23L 29/10* (2016.08); *A23L 33/115* (2016.08); *A23L 33/12* (2016.08); *A23V 2002/00* (2013.01); *A23V 2200/10* (2013.01); *A23V 2200/222* (2013.01); *A23V 2250/05* (2013.01); *A23V 2250/1598* (2013.01); *A23V 2250/1876* (2013.01); *A23V 2250/1878* (2013.01); *A23V 2250/1886* (2013.01); *A23V 2300/26* (2013.01)

(58) Field of Classification Search
CPC ........ A21D 2/16; A23D 7/0053; A23D 7/011; A23D 7/04; A23D 7/05; A23D 9/013; A23L 29/015; A23L 29/04; A23L 29/10; A23L 33/115; A23L 33/12; A23V 2002/00; A23V 2200/10; A23V 2200/222; A23V 2250/05; A23V 2250/1598; A23V 2250/1876; A23V 2250/1878; A23V 2250/1886; A23V 2300/26
See application file for complete search history.

(56) References Cited

U.S. PATENT DOCUMENTS

| | | | |
|---|---|---|---|
| 4,424,237 A | 1/1984 | Wittman, III | |
| 2005/0214436 A1* | 9/2005 | Doucet | A23D 9/013 426/606 |
| 2007/0009643 A1* | 1/2007 | Baseeth | A23P 30/40 426/601 |
| 2012/0064193 A1 | 3/2012 | Erickson et al. | |

FOREIGN PATENT DOCUMENTS

| | | | |
|---|---|---|---|
| EP | 0 634 68 A2 | 10/1982 | |
| EP | 0 570 631 A1 | 11/1993 | |
| GB | 2 049 720 A | 12/1980 | |
| GB | 2049720 A * | 12/1980 | ............... A21D 2/16 |
| GB | 2 116 993 A | 10/1983 | |
| GB | 2 120 522 A | 12/1983 | |

OTHER PUBLICATIONS

International Search Report and Written Opinion for PCT/US2017/027527 dated Aug. 14, 2017 (4 pages).
Katan et al., "Trans fatty acids and their effect upon lipoproteins in the human body", Ann Rev Nutr, 1995, vol. 15, pp. 473-493.

* cited by examiner

*Primary Examiner* — Latosha Hines
(74) *Attorney, Agent, or Firm* — Foley & Lardner LLP

(57) ABSTRACT

The present invention relates to a method for preparing a monoglyceride hydrate product, which product may be used as an emulsifier in various food and non-food applications. The present invention further relates to the monoglyceride hydrate product obtainable by said method. The invention further relates to a monoglyceride hydrate product, comprising monoglycerides, with saturated fatty acid residues, water and non-hydrogenated monoglycerides and/or diglycerides having unsaturated fatty acid residues.

16 Claims, No Drawings

METHOD FOR THE PREPARATION OF A MONOGLYCERIDE HYDRATE PRODUCT

CROSS-REFERENCE TO RELATED APPLICATIONS

This application is a continuation of U.S. patent application Ser. No. 16/093,525 filed Apr. 14, 2017, which application is a National Phase of International Patent Application No. PCT/US2017/027527, filed Apr. 14, 2017, published on Oct. 19, 2017 as WO 2017/180935 A1, which claims priorities to European Patent Application No. 16165612.9, filed on Apr. 15, 2016 and U.S. Provisional Application No. 62/323,074, filed Apr. 15, 2016. The contents of these applications are herein incorporated by reference in their entireties.

FIELD OF THE INVENTION

The present invention relates to a method for preparing a monoglyceride hydrate product, which product may be used as an emulsifier in various food and non-food applications. The present invention further relates to the monoglyceride hydrate product obtainable by said method.

The invention further relates to a monoglyceride hydrate product, comprising monoglycerides, with saturated fatty acid residues, water and non-hydrogenated monoglycerides and/or diglycerides having unsaturated fatty acid residues.

BACKGROUND OF THE INVENTION

In the food industry emulsifiers are commonly used as food additives. Well known emulsifiers are monoglyceride based emulsifiers. Because of the hydrophilic free hydroxyl groups in the glycerol part of the monoglyceride molecule, and the lipophilic fatty acid part of the monoglyceride, the material is surface active and may thus be used as a surfactant. Hence, these products are commonly used to stabilize emulsions, improve the texture and volume of cakes and to improve the crumb softness of bread.

The preparation of monoglycerides is well known in the art and they are generally prepared as follows. Edible fats and/or fat derived fatty acids are reacted with glycerol. This leads to a mixture of mono-, di-, and triglycerides and minor quantities of free glycerol, water and free fatty acids. Since the 1- and 2-monoglycerides are the most active components in the mixture, it is desirable to limit the di- and triglyceride content of the product. In order to achieve this, distillation techniques have been developed and used to prepare distilled monoglyceride compositions containing in excess of 85% monoglycerides, principally in the 1-monoglyceride form.

Furthermore, most distilled monoglyceride based emulsifiers have been furnished as either a beaded or fine powder, a plastic or as a water paste (hydrate). The hydrated emulsifiers are typically used in applications like bakery dough that benefit from their properties such as their easy process ability and their good functionality.

These types of hydrated monoglyceride based emulsifiers generally consist for the larger part of water and predominantly saturated monoglycerides (i.e. the primary emulsifier). However, in order to be able to prepare a stable paste like hydrate product from said primary emulsifier, most often a minor amount of a co-emulsifier is added. These co-emulsifiers are generally prepared from partly hydrogenated mono-, and diglycerides.

In this regard it is noted that the fatty acid residues of the monoglycerides used in both the primary- and co-emulsifier generally have between 12 and 22 carbon atoms. Furthermore, the (saturated) monoglycerides of the primary emulsifier generally have an iodine value in the range of 0 to 15, while the mono-, and diglycerides of the co-emulsifier generally have an iodine value of 25 or higher.

Furthermore, vegetable fats and oils comprise highly unsaturated cis-fatty acid residues. In order to make these more saturated and suitable for use in the co-emulsifier, the fatty acid residues are partly hydrogenated. However, a byproduct of (partly) hydrogenation of the carbon-carbon double bonds of the unsaturated fatty acid residues are trans-fatty acid residues formed via conversion from the natural cis-configuration to the trans-configuration.

Recent studies have indicated that trans-fatty acids impact cardiovascular health more negatively than saturated fatty acids do. Trans-fatty acids have amongst other been linked to an increase in blood serum cholesterol content (Katan, M. B. 1995. Trans fatty acids and their effect upon lipoproteins in humans, *Ann. Rev. Nutr.* 15, 473-493). In part due to this recent research, consumers are becoming more attentive to the trans-fatty acid content of their diets and many consumers are beginning to prefer products with lower trans-fatty acid content.

Hence, a need has arisen for the development of hydrated monoglyceride based emulsifiers which do not comprise monoglycerides and diglycerides with partly hydrogenated fatty acid residues.

However, it has been found that the development of such products is not straight forward when removing the trans fatty acid residues, and that if no special measures are taken, products with unacceptable handling and/or shelf-life properties or poor emulsifying properties or both are obtained. Hence, a need remains for monoglyceride hydrate products with a low amount of trans-fatty acid residues. A need also exists for an efficient method for preparing these types of products.

SUMMARY OF THE INVENTION

A first aspect of the present invention relates to a method for preparing a monoglyceride hydrate product comprising the steps of:
 a. providing a monoglyceride composition having an iodine value of 15 or lower and mixing said composition with water, wherein the ratio monoglycerides to water ranges from 4:1 to 1:5, preferably from 1:1 to 1:3.5;
 b. cooling the mixture of step a) below the Krafft temperature of the monoglyceride composition, such that at least a part of the monoglycerides crystallize;
 c. mixing the mixture of step b) with a co-emulsifier comprising non-hydrogenated monoglycerides and/or diglycerides and having an iodine value of 25 or higher.
 d. homogenizing the mixture of step c);
and wherein the monoglyceride hydrate product obtained in step d) comprises:
 15 to 80% by weight monoglycerides having an iodine value of 15 or lower;
 0.5 to 20% by weight non-hydrogenated monoglycerides and/or diglycerides having an iodine value of 25 or higher;
 5 to 80% by weight water.

A second aspect of the present invention relates to a method for preparing a monoglyceride hydrate product comprising the steps of:
a. providing a monoglyceride composition having an iodine value of 15 or lower and mixing said composition with water, wherein the ratio monoglycerides to water ranges from 4:1 to 1:5, preferably from 1:1 to 1:3.5;
b. cooling the mixture of step a) below the Krafft temperature of the monoglyceride composition, such that at least a part of the monoglycerides crystallize;
c. mixing the mixture of step b) with a co-emulsifier comprising non-hydrogenated monoglycerides and/or diglycerides and having an iodine value of 25 or higher; and
d. homogenizing the mixture of step c);

With the methods of the present invention it has now for the first time become possible to prepare a monoglyceride hydrate product wherein a co-emulsifier is used which is non-hydrogenated and thus comprises a relatively low amount of trans-fatty acids residues.

A further aspect of the present invention relates to a monoglyceride hydrate product, such as an emulsifier, obtainable by the method according to the present invention.

A last aspect of the present invention relates to a monoglyceride hydrate product comprising:
15 to 80% by weight monoglycerides having an iodine value of 15 or lower;
0.5 to 20% by weight non-hydrogenated monoglycerides and/or diglycerides having an iodine value of 25 or higher;
5 to 80% by weight water.

Due to the fact that the monoglycerides in the product of the present invention have not been partially hydrogenated, the fatty acid residues comprise only low amounts, if any, trans-fatty acid residues and are thus considered more healthy. Furthermore, the product according to the present invention has excellent emulsifying properties.

Definitions

The term "fat", "oil" or "lipids" as used herein have their conventional meaning and refer to particles, including droplets and globules, of esters of glycerol and fatty acids, such as monoglycerides, diglycerides, triglycerides or a mixture thereof, in this regard reference is made to Gunstone et al., *The Lipid Handbook*, 2007.

The term "hydrogenation" or "hardening" as used herein has its conventional meaning and refers to the addition of hydrogen to double bonds present in unsaturated fatty acid residues of monoglycerides, diglycerides and triglycerides, in this regard reference is made to Gunstone et al., *The Lipid Handbook*, 2007.

The term "non-hydrogenated" as used herein refers to monoglycerides, diglycerides or triglycerides, which have not been subjected to a hydrogenation treatment.

The term "fatty acid" and "fatty acid residue" as used herein have their conventional meaning. The term fatty acid, refers to the fatty acid in a state wherein it is detached from the monoglyceride, diglyceride or triglyceride, the term fatty acid residue refers to the situation wherein the fatty acid is still bound to said glycerides.

The term "glyceride" as used herein has its conventional meaning and refers to glycerol molecules, which have been esterified with one, two, or three fatty acids to form monoglycerides, diglycerides, and triglycerides, respectively.

The term "iodine value" as used herein has its conventional meaning and refers to the mass of iodine in grams that is consumed by 100 grams of a glyceride and is used to determine the amount of unsaturation in fatty acids and residues. The higher the iodine number, the more double bonds are present, in this regard reference is made to Gunstone et al., *The Lipid Handbook*, 2007.

The term "Krafft temperature" as used herein has its conventional meaning and refers to the temperature point of phase change below which a surfactant, such as a mono- or di-glyceride, remains in crystalline form, even in aqueous solution. The Krafft temperature may be determined as has been described in Van de Walle et al., in *Food Research International*, 2008 pp. 1020-1025.

The term "homogenizing" as used herein has its conventional meaning and refers to the process of reducing and narrowing the particle size distribution of the glycerides in a mixture.

DETAILED DESCRIPTION OF THE INVENTION

A first aspect of the present invention relates to a method for preparing a monoglyceride hydrate product comprising the steps of:
a. providing a monoglyceride composition having an iodine value of 15 or lower and mixing said composition with water, wherein the ratio monoglycerides to water ranges from 4:1 to 1:5, preferably from 1:1 to 1:3.5;
b. cooling the mixture of step a) below the Krafft temperature of the monoglyceride composition, such that at least a part of the monoglycerides crystallize;
c. mixing the mixture of step b) with a co-emulsifier comprising non-hydrogenated monoglycerides and/or diglycerides and having an iodine value of 25 or higher.
d. homogenizing the mixture of step c); and
wherein the monoglyceride hydrate product obtained in step d) comprises:
15 to 80% by weight monoglycerides having an iodine value of 15 or lower;
0.5 to 20% by weight non-hydrogenated monoglycerides and/or diglycerides having an iodine value of 25 or higher;
5 to 80% by weight water.

More and more consumers are becoming worried about the use of trans-fatty acids in their diet. In view of this, the inventors of the present invention have developed a method for preparing monoglyceride hydrate product, such as emulsifiers, which do not comprise monoglycerides with partially hydrogenated fatty acid residues. Hence, the total amount of trans-fatty acids residues is considerably lower than in conventional products.

The present invention further relates to a method for preparing a monoglyceride hydrate product comprising the steps of:
a. providing a monoglyceride composition having an iodine value of 15 or lower and mixing said composition with water, wherein the ratio monoglycerides to water ranges from 4:1 to 1:5, preferably from 1:1 to 1:3.5;
b. cooling the mixture of step a) below the Krafft temperature of the monoglyceride composition, such that at least a part of the monoglycerides crystallize;
c. mixing the mixture of step b) with a co-emulsifier comprising non-hydrogenated monoglycerides and/or diglycerides and having an iodine value of 25 or higher;

d. homogenizing the mixture of step c).

The present inventors have found that in order to prepare with the methods of the present invention such a product with good emulsifying properties it is essential to add the co-emulsifier after the mixing of water with the monoglycerides with predominantly saturated fatty acid residues and after the partial crystallization of said monoglycerides (i.e. after preparation of the so called primary emulsifier).

As shown in the examples below, the mixing of all components in one process step gives a product with very poor properties. With the methods according to the present invention this problem has now surprisingly been overcome and a monoglyceride hydrate product has been obtained which has excellent properties.

Preferably, at least 75% by weight of the monoglycerides of the monoglyceride composition of step a) comprises fatty acid residues with a chain length between 12 and 22 carbon atoms. The fatty acid residues of these monoglycerides are highly saturated, which is exemplified by the relatively low iodine value. The fatty acid residues of these monoglycerides are typically selected from stearic acid, myristic acid, pentadecylic acid, palmitic acid and/or margaric acid. Most preferably, the fatty acid residues of the monoglycerides composition of step a) are from stearic acid.

Since saturated monoglycerides have generally the best emulsifying properties, it is preferred that the fatty acid residues of the monoglycerides of the composition of step a) are highly saturated. Hence, the iodine value of these monoglycerides is preferably 10 or lower, more preferably 5 or lower.

In step a) the mixing of the monoglyceride composition—which thus comprises a high amount of monoglycerides with saturated fatty acid residues—is carried out at a temperature between 50° and 90° C. This temperature is well above the so-called Krafft-temperature of monoglycerides, such that during the mixing process with water the monoglycerides do not substantially crystallize.

It has also been found that the mixing of step a) may be carried out in two or more sub steps. In an advantageous embodiment of the present invention, the monoglyceride composition is first mixed with relatively small portion of water (such as 10 to 35% by weight of the total amount of water to be added) at a relatively high temperature (such as 70 to 90° C.) and thereafter mixed with the remainder of water (such as 65% to 90% by weight) at a lower temperature (such as 45 to 70° C.).

However, in any case the ratio monoglycerides to water in step a) ranges from 4:1 to 1:5, preferably from 1:1 to 1:3.5.

It has also surprisingly been found that the presence of minerals in the water used has a negative influence on the properties of the monoglyceride product obtained. Hence, the total amount of minerals, and in particular $CaCO_3$, in the water used is preferably below 10 mg per liter.

In step b) of the method according to the present invention, the mixture of step a) is cooled to a temperature below the Krafft temperature of the monoglyceride composition. This temperature can easily be established by means of XRD or DSC as referred to in Van de Walle et al., in *Food Research International*, 2008 pp. 1020-1025.

Due to this lowering of the temperature, the (saturated) monoglycerides of the composition of step a) crystallize and at least partly precipitate. Hence, the so-called primary emulsifier is obtained. Subsequently, the co-emulsifier comprising the non-hydrogenated relatively unsaturated monoglycerides and diglycerides is added. Without wishing to be bound by any theory, it is assumed that these relatively unsaturated mono- and diglycerides of the co-emulsifier coat the precipitated saturated monoglycerides of the composition of step a) and allow it to form a stable hydrate product with excellent properties.

In order to obtain a relatively fast and complete crystallization of the monoglycerides of the composition of step a), it is preferred to lower in step b) the temperature at least 2 degrees below said Krafft-temperature.

As already referred to above, the monoglycerides and/or diglycerides of the co-emulsifier are relatively unsaturated, i.e. they comprise on average one or more double carbon bonds. This is exemplified by their relatively high iodine value.

Furthermore, it is desirable for the co-emulsifier to be derived from non-hydrogenated feedstocks. In this regard it is noted that in general more than 90% by weight of the mono- and diglycerides of the co-emulsifier are non-hydrogenated, preferably more than 99% by weight. Hence, the amount of trans-fatty acid residues will be very low. Hence, the ratio of trans-fatty acid residues to unsaturated cis-fatty acids residues in the fatty acid chains of the monoglycerides and/or diglycerides of the co-emulsifier is less than 5%, preferably less than 2% (as may be determined as described in Ghazani et al., *J am Oil Chem Soc,* 2013, pp. 923-932.

In an embodiment of the present invention the monoglycerides and/or diglycerides of the co-emulsifier are chosen from cis-unsaturated monoglycerides, cis-unsaturated diglycerides, saturated diglycerides or a combination thereof.

In a further embodiment of the present invention at least 75% by weight the monoglycerides and/or diglycerides of the co-emulsifier comprise fatty acid residues chosen from oleic acid, linoleic acid, α-linolenic acid, γ-linolenic acid or a combination thereof. Preferably said monoglycerides and/or diglycerides comprise fatty acid residues of oleic acid.

In a particularly preferred embodiment of the present invention at least 75% by weight of the monoglycerides in the composition of step a) comprise fatty acid residues from stearic acid; at least 75% by weight of the mono- and diglycerides of the co-emulsifier comprise fatty acid residues from oleic acid.

The quantities of the different constituents of the monoglyceride hydrate product according to the present invention may vary depending on the intended application and food product. However, the product obtained in step d) of the method of the present invention preferably comprises:
- 15 to 80% by weight monoglycerides having an iodine value of 15 or lower;
- 0.5 to 20% by weight non-hydrogenated monoglycerides and/or diglycerides having an iodine value of 25 or higher;
- 5 to 80% by weight water.

Furthermore, in order to avoid microbial spoilage before, after or during any of the steps a) to d) a microbial growth inhibitor may be added. Preferably use is made of an acidic microbial growth inhibitor, such as an organic acid. A preferred microbial growth inhibitor used in the present invention is propionic acid.

A further aspect of the present invention relates to a monoglyceride hydrate product obtainable by the methods as described above. As referred to above, the hydrate product according to the present invention is particularly useful as an emulsifier. However, importantly its trans-fatty acid residues content is remarkably low.

A further aspect of the present invention relates to a monoglyceride hydrate product comprising:
- 15 to 80% by weight monoglycerides having an iodine value of 15 or lower;

0.5 to 20% by weight non-hydrogenated monoglycerides and/or diglycerides having an iodine value of 25 or higher;

5 to 80% by weight water.

As explained above, it has up till now not been possible to prepare a stable and fully functional monoglyceride hydrate product, such as an emulsifier, on the basis of a co-emulsifier made predominantly from non-hydrogenated monoglycerides, i.e. which is low in trans-fatty acid residues. The present inventors have now surprisingly been able to formulate such a product.

Furthermore, the monoglyceride hydrate product according to the present invention comprises a remarkably low amount of so called free water, i.e. water separated from the general product matrix (also referred to as phase separation). The amount of free water of the monoglyceride hydrate products according to the present invention is generally below 10 µL per gram, preferably below 5 µL per gram, even more preferably below 2 µL per gram.

It has also been observed that the monoglyceride hydrate product according to the present invention does not comprise lumps or aggregates having a volume/surface average diameter (d32) greater than 100 µm, preferably less than 50 µm (as determined by light scattering, as amongst others mentioned in P. Walstra et al., Physical Chemistry of Foods, 2003.).

Preferably, the monoglyceride hydrate product according to present invention comprises:

15 to 80% by weight monoglycerides having an iodine value of 15 or lower and wherein the fatty acid residues thereof are chosen from stearic acid, myristic acid, pentadecylic acid, palmitic acid, margaric acid or a combination thereof;

0.5 to 20% by weight non-hydrogenated monoglycerides and/or diglycerides having an iodine value of 25 or higher and wherein the fatty acid residues thereof are chosen from oleic acid, linoleic acid, α-linolenic acid, γ-linolenic acid or a combination thereof;

5 to 80% by weight water.

Furthermore, the ratio of trans-fatty acid residues to unsaturated cis-fatty acids residues in the fatty acid chains of the monoglycerides and/or diglycerides of the product according to the present invention is preferably less than 5%, preferably less than 2% (as may be determined as described in Ghazani et al., *J am Oil Chem Soc*, 2013, pp. 923-932.

The monoglyceride hydrate product according to the present invention further preferably comprises a microbial growth inhibitor, preferably an acidic microbial growth inhibitor, more preferably an organic acid, most preferably propionic acid.

A last aspect of the present invention relates to use of the monoglyceride hydrate product referred to above as an emulsifier in food products. The product is particularly suitable for use as an emulsifier in a dough strengthener, flavoring agent, adjuvant, formulation aid, lubricant, release agent, solvent, vehicle, stabilizer, thickener, surface-finishing agent, texturizer and/or crumb softener.

The invention will now be illustrated further by means of the following non-limiting examples.

EXAMPLES

Comparative experiment: Traditional Hydrate Manufacturing Method 58.75 g of a stearic acid based distilled monoglyceride (i.e. fully hydrogenated soybean oil) and 2.50 g of an oleic acid based monoglyceride co-emulsifier (i.e. canola oil based) with an iodine value of approximately 80 were charged into a jacketed beaker maintained at 75° C. Once molten, the emulsifier blend was stirred at 500 rpm. 37.56 g of room temperature deionized water were added slowly to the stirred emulsifier. After addition, the mixture was stirred for 5 min before the temperature was lowered to 60° C. An additional 139.75 g of room temperature deionized water were then added and mixed for 10 min. The temperature was further lowered to 40° C. and stirred for 10 min prior to addition of 11.44 g of acidified water (11.4% propionic acid/0.85% phosphoric acid) for preservation.

The resulting gel product was grainy with small particles that formed during water addition. The graininess was explained by the presence of relatively large particles in the product. It was determined by means of light scattering (Wyatt Technology Dyna Pro Titan Dynamic Light scattering apparatus or equivalent on a 0.1 mg/mL suspension of the lyophilized hydrate sample) that the product comprises a relatively large amount of particles having a particle size above 100 µm. Furthermore, phase separation was observed upon standing at room temperature. To this end samples were collected in 8 oz jars and allowed to settle for 30 minutes. Thereafter, the sample was decanted and the amount of free water was expressed in µL of water per gram of product. The amount of free water was as high as 10 µL/g. Moreover, the emulsifying properties were very poor.

Example 1: Improved Hydrate Manufacturing Method (23.5% by Weight Saturated Monoglycerides Content)

58.75 g of a stearic acid based distilled monoglyceride were charged into a jacketed beaker maintained at 75° C. Once molten, the emulsifier was stirred at 500 rpm. 37.56 g of room temperature deionized water were added slowly to the stirred emulsifier. After addition, the mixture was stirred for 5 min before the temperature was lowered to 60° C. An additional 139.75 g of room temperature deionized water were then added and mixed for 10 min. The temperature was further lowered to 40° C. and stirred for 10 min. After reaching the targeted temperature, 2.50 g of an oleic acid based monoglyceride co-emulsifier with an iodine value of approximately 80 was blended into the gel, and the system mixed for 15 min prior to addition of 11.44 g of acidified water (11.4% propionic acid/0.85% phosphoric acid) for preservation. The resulting product was a smooth (i.e. it did not comprise particles with a size larger than 25 micron as determined by means of light scattering), creamy paste with no signs of phase separation during storage at room temperature. Phase separation was determined by assessing the amount of so called free water. To this end samples were collected in 8 oz jars and allowed to settle for 30 minutes. Thereafter, the sample was decanted and the amount of free water was expressed in µL of water per gram of product. The amount of free water was less than 5 µL per gram. Furthermore, the so called water proton spin-spin relaxation time, $T_2$, of this product was also measured using pulsed NMR (Bruker Minispec mq20). It was found that this product had a mean relaxation time $T_2$ of 560 milliseconds (ms). This is considerably lower than the relaxation time $T_2$ of traditional products (such as GMS 90 of Corbion, having a mean $T_2$ of 590 ms) and shows that the new products comprise more immobilized water than the traditional products.

Example 2: Improved Hydrate Manufacturing Method (38.3% Saturated Monoglyceride Content)

153.13 g of molten stearic acid based distilled monoglyceride were charged into a jacketed beaker maintained at 75°

C. The stirrer was set to mix at 500 rpm throughout the preparation. 98.15 g of room temperature deionized water were added slowly to the stirred emulsifier. After addition, the mixture was stirred for 5 min before the temperature was lowered to 64° C. An additional 107.55 g of room temperature deionized water were then added and mixed for 10 min. The temperature was further lowered to 40° C. and stirred for 10 min. After reaching the targeted temperature, 22.88 g of an oleic acid based monoglyceride co-emulsifier with an iodine value of approximately 80 was blended into the gel, and the system mixed for 15 min prior to addition of 18.30 g of acidified water (11.4% propionic acid/0.85% phosphoric acid) for preservation. The resulting product was a smooth, thick paste with no signs of phase separation during storage at room temperature. Furthermore, the so called water proton spin-spin relaxation time, T2, was also measured using pulsed NMR (Bruker Minispec mq20). It was found that this product had a mean relaxation time T2 of 230 milliseconds (ms). This is considerably lower than the relaxation time of the traditional products and shows that the new products comprise more immobilized water than the traditional products. In this regard it is noted that the water proton spin-spin relaxation time, T2, of a traditional product, such as GMS 90 Double Strength is 430 milliseconds.

Example 3: Bakery Application Test Procedures

A. Bread Volume Evaluation

The volume of each loaf of bread was measured using a Stable Micro Systems, Ltd (Godalming, Surrey, UK) VolScan Profiler 600, which uses a laser-based scanner to generate a 3-D image of the loaf from the measurement of 400 data points collected per revolution. The volume of the bread was evaluated for size, oven spring, and shape uniformity.

B. Sensory Evaluation

The organoleptic properties of each loaf were evaluated by trained panelists on day 3 and day 7 after baking. The panelists evaluated each loaf according to taste, aroma, mouth feel, crumb texture, crumb color, crust color, break and shred, and symmetry shape.

The results from each sensory test were evaluated statistically using standard one-way analysis of variance (ANOVA) and Duncan's multiple range test. The analyses were performed using the SPSS Inc. (Chicago, Il) SPSS v. 9 statistical software. Differences between samples were deemed significant if the p value was found to be less than 0.05.

C. Bread Freshness and Quality (Staling) Evaluation

The firmness, resilience, and adhesiveness of each loaf were measured according to the AACC method 74-09 for measurement of bread firmness with modifications to provide a complete texture profile analysis (TPA). Tests were performed on a Stable Micro Systems (Godalming, Surrey, UK) TA.XT2i Texture Analyzer using a 1½" diameter cylinder probe (part #TA-4), a 30 kg load cell, and a movable crosshead set to 1 mm/sec for both the compression and withdrawal phase. The double compression test was carried out to a 25% strain on the first compression and to a 40% strain on the second compression, with a final three second hold. Measurements were collected in triplicate on day 3 and day 7 after baking, where each replicate corresponded to an average of eight separate readings per loaf.

D. Functionality Assessment Scoring

Results from evaluations on dough handling, volume, sensory, staling, and crumb quality were converted into a score ranging from 0.0 (undesirable) to 5.0 (ideal). The definitions of "undesirable" and "ideal" used are given in Table 1 below.

| Attribute | Undesirable (0) | Ideal (5) |
| --- | --- | --- |
| Dough handling | Gassy/sticky dough | Not gassy/sticky dough |
| Bread volume | Smaller size and greater oven spring relative to control, lack of shape symmetry | Larger size and equal oven spring relative to control, uniform shape symmetry |
| Sensory | Undesirable texture and taste | Desirable texture and taste |
| Staling | Significant changes observed in the firmness, reliance, and adhesiveness of the bread after 3 and 7 days | No changes observed in the firmness, reliance, and adhesiveness of the bread after 3 and 7 days |
| Crumb Quality | Closed and non-uniform crumb | Open and uniform crumb |

E. Standard Baking Procedure

To prepare each dough, 5 kg of the dry mix ingredients plus yeast were blended with the required amount of water and mixed for 2 minutes at low speed and 8 min at high speed using a G. Cinelli-Esperia Corporation (Woodbridge, ON, Canada) 100 kg spiral mixer model CG/60/CG(75). Dough handling was evaluated during preparation by a trained baker. The dough was allowed to rest for 5 min prior to division and rounding by hand into twelve 640 g pieces.

Dough balls were rested for 5 min before final shaping through the molder. Shaping was accomplished using an ACME D.R. McClain & Son (Pico Rivera, CA) Rol-Sheeter Model 88 with roller 1 set to 2.4 and roller 2 set to 2.5 and arranged on corrugated, double strap pans with top internal dimensions (l×w) of 34.9 cm×12.7 cm, bottom external dimensions (l×w) of 30.5 cm×10.8 cm, and a height of 8.9 cm.

The molded doughs were allowed to ferment in a National MFG, Co. (Lincoln, NE) fermentation (proofing) cabinet for 1 h at 30° C. and 85% relative humidity. After fermentation, the doughs were baked in a Reed Oven Co. (Kansas City, MO) retail oven model 4-20×56 at 216° C. for 21 min (white pan) or 22 min (whole wheat).

After baking, the loaves were allowed to cool on racks at room temperature for 1 h before manual packaging in standard bread poly bags and placed in an environmental storage room maintained at 22° C. Bread volumes were recorded 24 h after baking according to the method of A).

On each test day, test loaves were removed from the storage room and sliced using an Oliver Machinery, Co (Grand Rapids, MI) Reciprocating Bread Safety-Slicer. The organoleptic properties and firmness were assessed according to the procedures described in B) and C), respectively. The results of all tests were converted to a score ranging from 0.0 (undesirable) to 5.0 (ideal) in accordance with D) as referred to above.

Example 4: White Pan No-Time Dough Bake Test Evaluation of Products Manufactured Using the Improved Manufacturing Method (38.3% Saturated Monoglycerides Content)

GMS® 90 Double Strength (Corbion, Grandview, MO) was used as a commercial hydrate control. The novel hydrated monoglyceride, containing an overall emulsifier content of 44.0%, was prepared according to the method described in example 2 above. White no-time doughs were prepared according to the procedure described in paragraph E) above and using the formulae shown in Table II below. Ultra Fresh® Premium 250 enzyme blend was obtained from Corbion (Lenexa, KS).

TABLE I

White Pan No-Time Dough Formula

Composition (% w/w)

| Ingredient | Commercial Hydrated Monoglyceride Control | | New Monoglyceride Hydrate (1:1 Replacement) | | New Monoglyceride Hydrate (1:0.8 Replacement) | |
|---|---|---|---|---|---|---|
| | Flour Basis | True Basis | Flour Basis | True Basis | Flour Basis | True Basis |
| Wheat Flour | 100% | 54.3% | 100% | 54.3% | 100% | 54.4% |
| Sugar | 8.0% | 4.3% | 8.0% | 4.3% | 8.0% | 4.4% |
| Salt | 2.0% | 1.1% | 2.0% | 1.1% | 2.0% | 1.1% |
| Soybean Oil | 2.0% | 1.1% | 2.0% | 1.1% | 2.0% | 1.1% |
| Water | 63.5% | 34.5% | 63.5% | 34.5% | 63.5% | 34.5% |
| Compressed Yeast | 6.80% | 3.69% | 6.80% | 3.69% | 6.80% | 3.70% |
| Ultra Fresh ® Premium 250 | 0.25% | 0.14% | 0.25% | 0.14% | 0.25% | 0.14% |
| Calcium Propionate | 0.50% | 0.27% | 0.50% | 0.27% | 0.50% | 0.27% |
| Ascorbic Acid | 0.004% | 0.002% | 0.004% | 0.002% | 0.004% | 0.002% |
| Monoglyceride Hydrate | 1.0% | 0.54% | 1.0% | 0.54% | 0.80% | 0.44% |

The scores associated with the functionality testing results of the hydrates in a white pan no-time dough application are summarized in FIG. 1.

With respect to FIG. 1 it is noted that overall, at a 1:1 replacement in a white pan no-time dough application, the new hydrate according to the present invention was found to performed equally as well as the currently manufactured hydrate having performed similarly on dough handling, softness, and crumb, while outperforming the commercial hydrate in volume. At a reduced application level, the new hydrate either performed equally as well or outperformed the control in all attributes considered demonstrating a significant improvement over the currently marketed hydrate product for this application.

Example 5: Whole Wheat No-Time Dough Bake Test Evaluation of Products Manufactured Using the Improved Manufacturing Method (38.3% Saturated Monoglyceride Content)

GMS® 90 Double Strength (Corbion, Grandview, MO) was used as a commercial hydrate control. The novel hydrated monoglyceride according to the present invention, containing an overall emulsifier content of 44.0%, was prepared according to the method described in example 2, above. Whole wheat no-time doughs were prepared according to the procedure described in paragraph E) above and using the formulae shown in Table III below. Ultra Fresh® Premium 250 enzyme blend was obtained from Corbion (Lenexa, KS).

TABLE III

Whole Wheat No-Time Dough Formula

Composition (% w/w)

| Ingredient | Commercial Hydrated Monoglyceride Control | | New Monoglyceride Hydrate (1:1 Replacement) | | New Monoglyceride Hydrate (1:0.8 Replacement) | |
|---|---|---|---|---|---|---|
| | Flour Basis | True Basis | Flour Basis | True Basis | Flour Basis | True Basis |
| Whole Wheat Flour | 100% | 51.6% | 100% | 51.6% | 100% | 51.7% |
| Sugar | 8.0% | 4.1% | 8.0% | 4.1% | 8.0% | 4.1% |
| Wheat Gluten | 4.0% | 2.1% | 4.0% | 2.1% | 4.0% | 2.1% |
| Salt | 2.0% | 1.0% | 2.0% | 1.0% | 2.0% | 1.0% |
| Soybean Oil | 2.0% | 1.0% | 2.0% | 1.0% | 2.0% | 1.0% |
| Water | 68.5% | 35.4% | 68.5% | 35.4% | 68.5% | 35.4% |
| Compressed Yeast | 7.50% | 3.87% | 7.50% | 3.87% | 7.50% | 3.87% |
| Ultra Fresh ® Premium 250 | 0.25% | 0.13% | 0.25% | 0.13% | 0.25% | 0.13% |
| Calcium Propionate | 0.50% | 0.26% | 0.50% | 0.26% | 0.50% | 0.26% |
| Ascorbic Acid | 0.004% | 0.002% | 0.004% | 0.002% | 0.004% | 0.002% |
| Monoglyceride Hydrate | 1.0% | 0.52% | 1.0% | 0.52% | 0.80% | 0.41% |

The scores associated with the functionality testing results of the hydrates in a whole wheat no-time dough application are summarized in FIG. 2. With respect to this FIG. 2 the following is noted.

Overall, at a 1:1 replacement in a whole wheat no-time dough application, the new hydrate according to the present invention was found to performed equally as well as the currently manufactured hydrate having performed similarly on sensory and softness, while outperforming the commercial hydrate in dough handling. At a reduced application level, the new hydrate outperformed the control in all attributes considered demonstrating a significant improvement over the currently marketed hydrate product for this application.

The invention claimed is:

1. A monoglyceride hydrate product comprising consisting of:
   (a) 15 to 80% by weight monoglycerides having an iodine value of 15 or lower;
   (b) 0.5 to 20% by weight non-hydrogenated monoglycerides and/or diglycerides having an iodine value of 25 or higher; and
   (c) 5 to 80% by weight water;
   wherein the monoglyceride hydrate product contains an aqueous phase comprising the monoglyceride (a) in crystalline form;
   wherein the monoglyceride hydrate product optionally comprises a microbial growth inhibitor; and
   wherein the aqueous phase optionally comprising minerals.

2. The monoglyceride hydrate product according to claim 1, consisting of:
   (a) 15 to 80% by weight monoglycerides having an iodine value of 15 or lower and wherein the fatty acid residues thereof are chosen from stearic acid, myristic acid, pentadecylic acid, palmitic acid, margaric acid or a combination thereof;
   (b) 0.5 to 20% by weight non-hydrogenated monoglycerides and/or diglycerides having an iodine value of 25 or higher and wherein the fatty acid residues thereof are chosen from oleic acid, linoleic acid, α-linolenic acid, γ-linolenic acid or a combination thereof; and
   5 to 80% by weight water;
   wherein the monoglyceride hydrate product optionally comprises a microbial growth inhibitor; and
   wherein the aqueous phase optionally comprising minerals.

3. The monoglyceride hydrate product according to claim 1, wherein the total amount of monoglycerides in the product is between 15 and 30% by weight and wherein the water proton spin-spin relaxation time T2 determined with NMR is less than 580 milliseconds.

4. The monoglyceride hydrate product according to claim 1, wherein the total amount of monoglycerides in the product is between 30 and 45% by weight and wherein the water proton spin-spin relaxation time T2 determined with NMR is less than 400 milliseconds.

5. The monoglyceride hydrate product according to claim 1, wherein the aqueous phase of the composition comprises less than 10 mg per liter minerals.

6. The monoglyceride hydrate product according to claim 5, wherein the minerals comprise $CaCO_3$.

7. The monoglyceride hydrate product according to claim 1, comprising a microbial growth inhibitor.

8. The monoglyceride hydrate product according to claim 7, wherein the microbial growth inhibitor is and acidic microbial growth inhibitor.

9. The monoglyceride hydrate product according to claim 8, wherein the microbial growth inhibitor is propionic acid.

10. The monoglyceride hydrate product according to claim 1, wherein at least 75% by weight of the monoglycerides comprises fatty acid residues with a chain length between 12 and 22 carbon atoms.

11. The monoglyceride hydrate product according to claim 1, wherein at least 75% by weight of the monoglycerides comprises fatty acid residues chosen from stearic acid, myristic acid, pentadecylic acid, palmitic acid and/or margaric acid.

12. The monoglyceride hydrate product according to claim 1, wherein the iodine value of the monoglycerides is 10 or lower.

13. The monoglyceride hydrate product according to claim 1, wherein the water comprises less than 10 mg per liter minerals.

14. The monoglyceride hydrate product according to claim 1, wherein the non-hydrogenated monoglycerides and/or diglycerides are chosen from cis-unsaturated monoglycerides, cis-unsaturated diglycerides, saturated diglycerides or a combination thereof.

15. The monoglyceride hydrate product according to claim 1, wherein the ratio of unsaturated trans-fatty acid residues to cis-fatty acids residues in the fatty acid chains of the non-hydrogenated monoglycerides and/or diglycerides is less than 5%.

16. The monoglyceride hydrate product according to claim 1, wherein at least 75% by weight of the non-hydrogenated monoglycerides and/or diglycerides comprise fatty acid residues chosen from oleic acid, linoleic acid, α-linolenic acid, γ-linolenic acid or a combination thereof.

* * * * *